United States Patent
Li et al.

(10) Patent No.: US 9,188,272 B2
(45) Date of Patent: Nov. 17, 2015

(54) DISPLAY DEVICE WITH VARIABLE HEIGHT AND ANGLES OF VIEW BY VIRTUE OF ROTATABLE STAND

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Gang Li, Shenzhen (CN); Chih-Kang Cho, New Taipei (TW); Ke-Fei Zou, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 285 days.

(21) Appl. No.: 13/902,277

(22) Filed: May 24, 2013

(65) Prior Publication Data

US 2014/0085783 A1  Mar. 27, 2014

(30) Foreign Application Priority Data

Sep. 21, 2012  (CN) .......................... 2012 1 0353838

(51) Int. Cl.

| | |
|---|---|
| G06F 1/16 | (2006.01) |
| F16M 11/00 | (2006.01) |
| F16M 11/06 | (2006.01) |
| F16M 11/08 | (2006.01) |
| F16M 11/10 | (2006.01) |
| F16M 13/00 | (2006.01) |
| H05K 5/00 | (2006.01) |
| H05K 7/00 | (2006.01) |

(52) U.S. Cl.
CPC ............... *F16M 11/00* (2013.01); *F16M 11/06* (2013.01); *F16M 11/08* (2013.01); *F16M 11/10* (2013.01); *F16M 13/005* (2013.01); *G06F 1/1601* (2013.01); *G06F 1/166* (2013.01); *F16M 2200/021* (2013.01); *F16M 2200/022* (2013.01); *F16M 2200/08* (2013.01)

(58) Field of Classification Search
CPC .......... F16M 2200/08; F16M 2200/00; F16M 2200/021; F16M 2200/022; G06F 1/166; G06F 1/1601
USPC ............... 361/679.21, 679.22, 679.59, 679.6; 248/917, 918, 919, 920, 921, 922, 923, 248/924, 349.1, 135, 136
See application file for complete search history.

(56) References Cited

U.S. PATENT DOCUMENTS

| | | | |
|---|---|---|---|
| 2005/0105257 A1* | 5/2005 | Shimizu et al. ............... | 361/681 |
| 2010/0148022 A1* | 6/2010 | Wang et al. .................... | 248/161 |
| 2010/0171011 A1* | 7/2010 | Wang et al. ................. | 248/176.3 |

* cited by examiner

*Primary Examiner* — Hoa C Nguyen
*Assistant Examiner* — Binh Tran
(74) *Attorney, Agent, or Firm* — Novak Druce Connolly Bove + Quigg LLP

(57) ABSTRACT

A stand, rotatable through approximately 180 degrees, supports a display device in such a way that whilst the height of the display device above a supporting surface is variable, a full range of viewing angles is also available at any height.

19 Claims, 5 Drawing Sheets

DISPLAY DEVICE WITH VARIABLE HEIGHT AND ANGLES OF VIEW BY VIRTUE OF ROTATABLE STAND

BACKGROUND

1. Technical Field

The present disclosure relates to a display device, more particularly to a display device with a rotatable stand.

2. Description of Related Art

A stand is usually provided to support a monitor. In order to adjust a visual angle of the monitor, the stand should be designed to be rotatable relative to the monitor. However, the height of the monitor cannot generally be adjusted. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
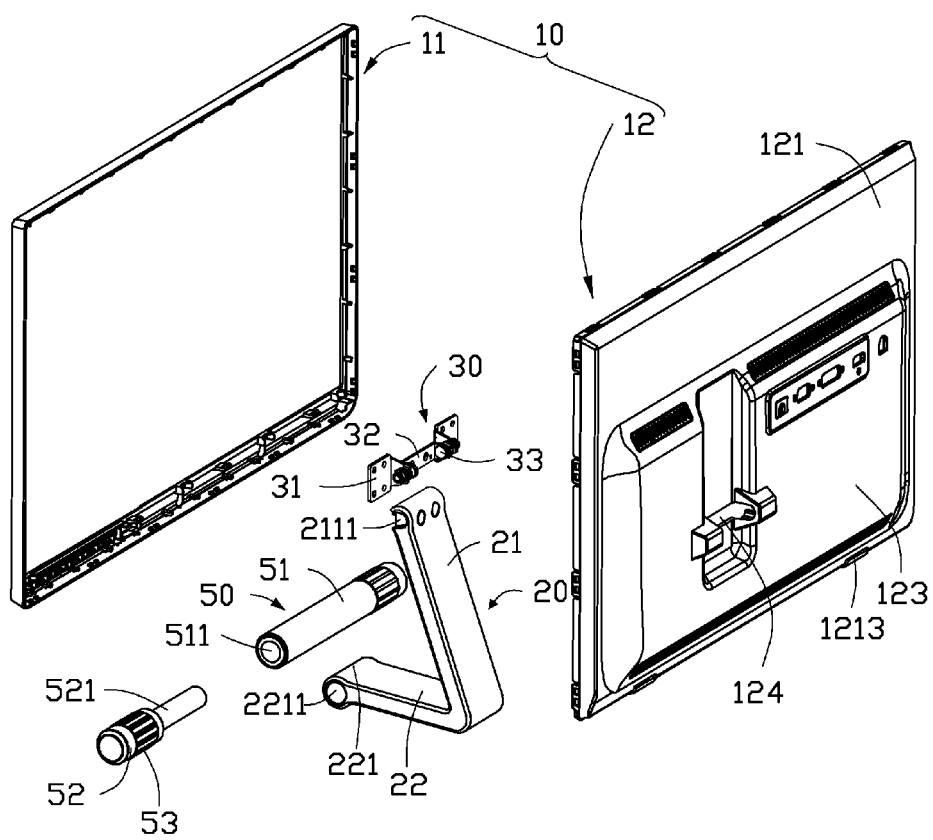
FIG. 1 is an exploded, isometric view of a display device in accordance with an embodiment.

FIG. 1 illustrates a display device of an embodiment. The display device comprises a monitor 10 and a stand 20.

Figure 2:
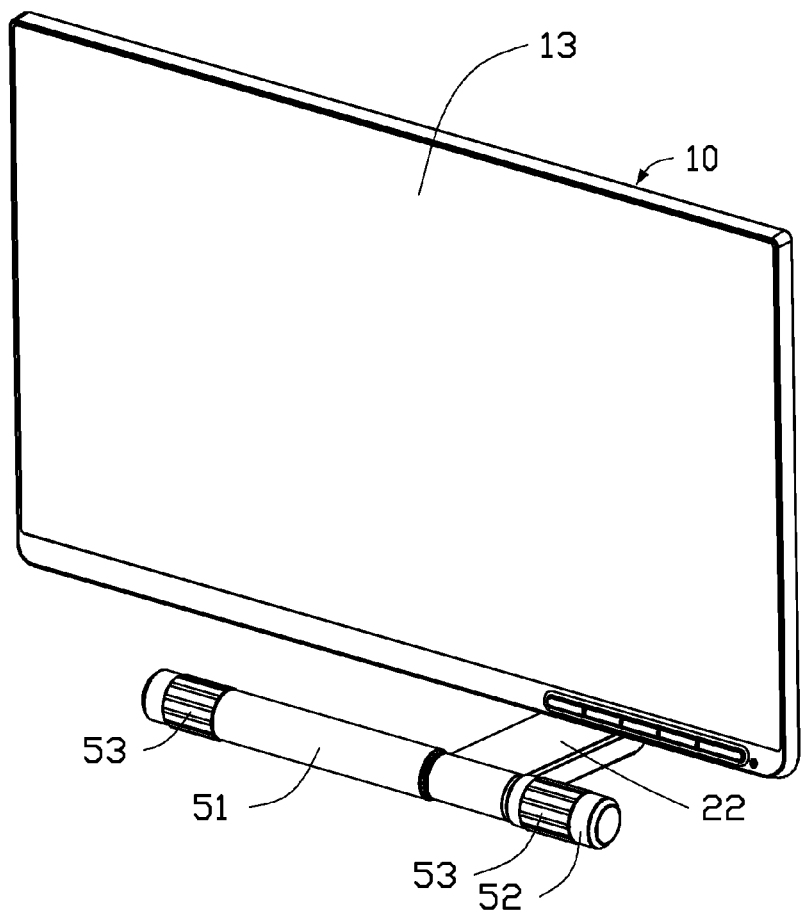
FIG. 2 is an isometric and assembled view of the display device of FIG. 1, showing the display device in a first position.
Figure 3:
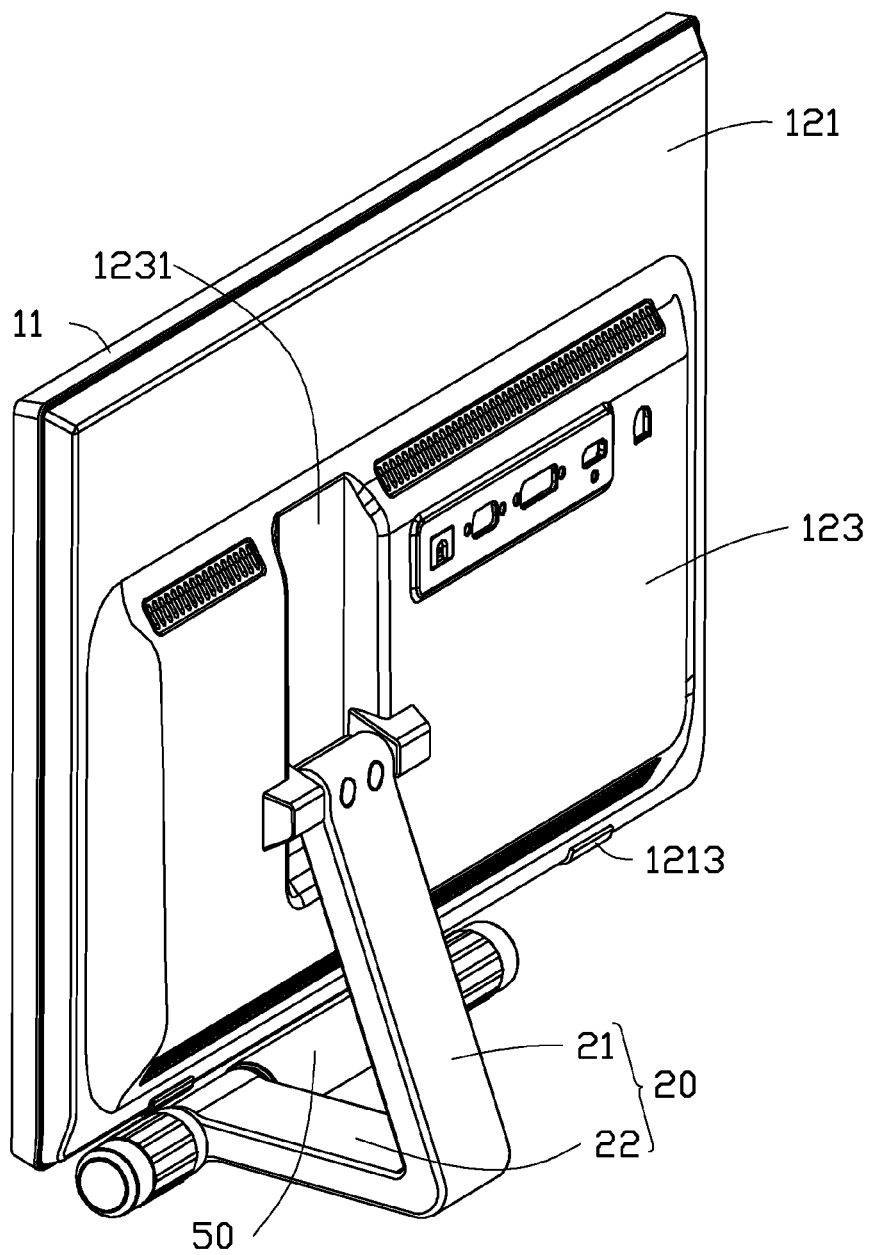
FIG. 3 is similar to FIG. 2, but viewed from a different aspect.
Figure 4:
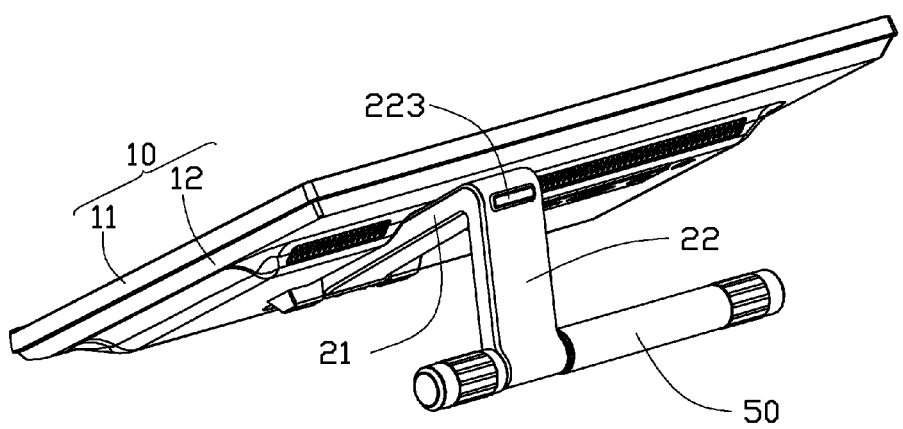
FIG. 4 is similar to FIG. 2, but showing the display device in a second position.

The monitor 10 comprises a first cover 12, a screen 13 (shown in FIG. 2), and a second cover 11. The second cover 11 is secured to the first cover 12, and the screen 13 is secured to the first cover 12. The first cover 12 comprises a cover plate 121 and a convex part 123 protruding from the cover plate 121. A concave portion 1231 (shown in FIG. 3) is defined in the convex part 123 of the first cover 12. A through opening 124 is defined in the concave portion 1231. Referring to FIGS. 3 and 4, an anti-slip pad 1213 is attached to both sides of the bottom edge of the monitor 10.

The stand 20 is an item of unitary construction, but reference will be made hereafter to two different portions, namely a first pole 21 and a second pole 22. An acute angle is defined between the first pole 21 and the second pole 22. The first pole 21 defines two cutouts 2111 at opposite sides of a distal end of the first pole 21, and two first fixing holes (not labeled) are defined in the distal end. The second pole 22 comprises a pivot portion 221 at the distal end. The pivot portion 221 defines a through hole 2211. Referring to FIGS. 3 and 4, an anti-slip pad 223 is attached to a bottom of the second pole 22.

The display device further comprises a support 50 attached to the second pole 22, to provide stability to the stand 20. The support 50 comprises a first supporting portion 52 and a second supporting portion 51. The first supporting portion 52 comprises a pivot pole 521. The second supporting portion 51 defines a pivot hole 511. A cylindrical anti-slip ring 53 is adjacent to the respective distal ends of each of the first supporting portion 52 and the second supporting portion 51. A cross-section of each of the first supporting portion 52 and the second supporting portion 51 is circuit, and the cross-section is substantially perpendicular to a central axis of the support 50. A cross-section of the support 50 is circular, and the cross-section is substantially perpendicular to a central axis of the support 50.

The display device further comprises a mounting member 30 configured to be secured to the first cover 12. The mounting member 30 comprises two mounting pieces 31 and a rotating piece 32. The rotating piece 32 is rotatably secured between the two mounting pieces 31 by two pivots 33. The rotating piece 32 defines two second fixing holes.

Referring to FIGS. 1 and 3, in assembly, the two mounting pieces 31 of the mounting member 30 are fixed to an inner surface of the first cover 12. The rotating piece 32 is inserted through the first cover 12 from inner side to outer side via the through opening 124. The second cover 11 is secured to the first cover 12 and secures the screen 13 to the first cover 12. The distal end of the first pole 21 is engaged in the concave portion 1231. The two pivots 33 of the mounting member 30 are received in the two cutouts 2111 of the first pole 21. The two first fixing holes of the first pole 21 are aligned with the two second fixing holes of the rotating piece 32, and two fasteners (not shown), such as screws, are fixed in the two first fixing holes and the two second fixing holes to secure the distal end of the first pole 21 to the rotating piece 32. Thus, the first pole 21 can be rotated together with the rotating piece 32 relative to the first cover 12.

The pivot pole 521 of the first supporting portion 52 slides through the through hole 2211 of the second pole 22 and is forced with slight effort into the pivot hole 511 of the second supporting portion 51, and the support 50 is thus rotatably secured to the second pole 22. In an embodiment, the support 50 is substantially perpendicular to at least one of the first pole 21 and the second pole 22.

Figure 5:
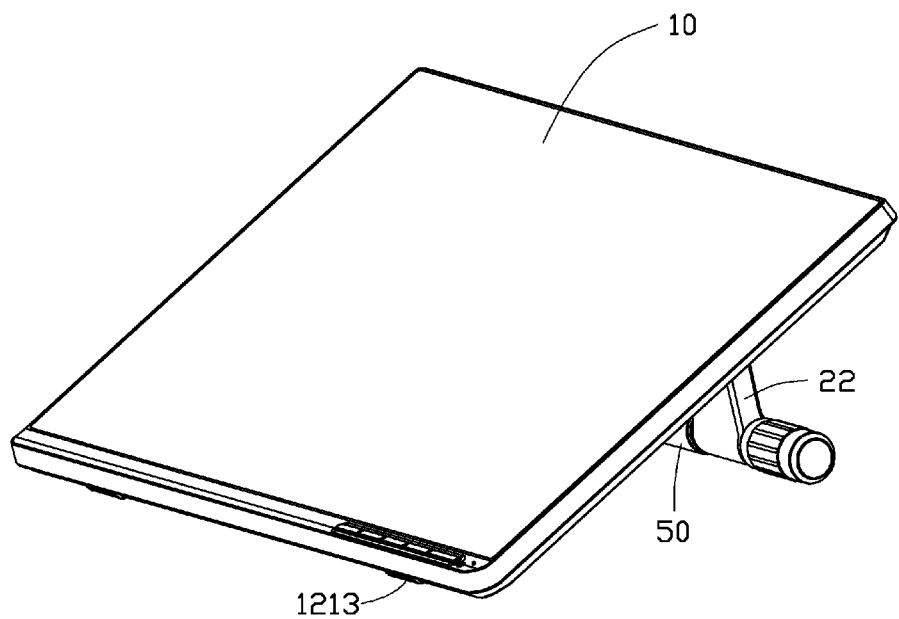
FIG. 5 is similar to FIG. 4, but viewed from a different aspect.

In use, the stand 20 is rotatable between a first position (illustrated in FIGS. 2 and 3) and a second position (illustrated FIGS. 4 and 5), through approximately 180 degrees relative to the monitor 10. When the stand 20 is in the first position, the second pole 22 and the support 50 are both flat on a supporting surface to supporting the monitor 10 at a first viewing angle. The supporting surface may be a top surface of a desk or a floor, for example. The anti-slip rings 53 and the anti-slip pad 223 stick to the supporting surface with substantial friction between the support surface and bottoms of the second pole 22 and the support 50. When the first viewing angle needs to be adjusted, the monitor 10 is rotated relative to the stand 20. In the rotation of the monitor 10, the two mounting pieces 31 rotate with the monitor 10 relative to the rotating piece 32. When the stand 20 is rotated from the first position to the second position, the first pole 21 is sunk into and lies in the concave portion 1231 and abuts a rear side of the monitor 10. The second pole 22, the support 50 and a bottom of the monitor 10 stand on the supporting surface and support the monitor 10 at a second angle. The anti-slip pads 1213 of the monitor 10 and the second anti-slip pad 223 grip the supporting surface with substantial friction between the supporting surface and a bottom of each of the monitor 10 and the stand 20. In the rotation of the stand 20, the rotating piece 32 is rotated together with the first pole 21 relative to the monitor 10 and the two mounting pieces 31. The height of the display device in the first position is thus greater than that in the second position.

In an embodiment, the second pole 22 is substantially perpendicular to the screen 13 when the monitor 10 is in the first position, and the first pole 21 is substantially parallel to the screen 13 when the monitor 10 is in the second position.

It is to be understood however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A display device comprising:
   a monitor;
   a stand comprising a first pole pivotably secured to the monitor and a second pole connected to the first pole;
   a support secured to the second pole for supporting the monitor and comprising a first supporting portion and a second supporting portion, the first supporting portion comprises a pivot pole, the second supporting portion defines a pivot hole, the second pole defines a through hole, and the pivot pole is engaged in the through hole and the pivot hole; and
   an anti-slip ring surrounding the first supporting portion and another anti-slip ring surrounding the second supporting portion;
   wherein the stand is rotatable between a first position, in which the second pole is positioned on a supporting surface; and a second position, in which the first pole abuts a back of the monitor, and the second pole and a bottom of the monitor are positioned on the supporting surface.

2. The display device of claim 1, wherein an acute angle is defined between the first pole and the second pole.

3. The display device of claim 1, wherein the support is substantially perpendicular to at least one of the first pole and the second pole.

4. The display device of claim 1, wherein the support is rotatable relative to the stand.

5. The display device of claim 1, wherein the monitor defines a through opening, a mounting member comprises two mounting pieces secured to an inner surface of the monitor and a rotating piece rotatably secured between the two mounting pieces, the rotating piece is located outside of the monitor through the through opening, and the first pole is secured to the rotating piece.

6. The display device of claim 5, wherein a concave portion is defined in the monitor on outer surface, the first pole is located in the concave portion, and the through opening is defined in the concave portion.

7. The display device of claim 1, wherein a first anti-slip pad is attached to the bottom of the monitor, and a second anti-slip pad is attached to a bottom of the second pole.

8. The display device of claim 1, wherein the monitor comprises a screen, the first pole is substantially perpendicular to the screen when the stand is in the first position, and the second pole is substantially parallel to the screen when the stand is in the second position.

9. The display device of claim 1, wherein a cross-section of the support is circular, and the cross-section is substantially perpendicular to a central axis of the support.

10. A display device comprising:
    a monitor comprising a screen;
    a stand comprising a first pole and a second pole, and the first pole pivotably secured to the monitor; and
    a support rotatably mounted to the second pole for supporting the monitor;
    wherein a cross-section of the support is circular, and the cross-section is substantially perpendicular to a central axis of the support;
    wherein the stand is rotatable between a first position, in which the second pole is substantially perpendicular to the screen and configured to be located on a supporting surface, and a second position, in which the first pole is substantially parallel to the screen, and the second pole and a bottom of the monitor are configured to be located on the supporting surface.

11. The display device of claim 10, wherein an acute angle is defined between the first pole and the second pole.

12. The display device of claim 10, wherein a support is secured to the second pole for supporting the monitor.

13. The display device of claim 12, wherein the support is substantially perpendicular to at least one of the first pole and the second pole.

14. The display device of claim 12, wherein the support is rotatable relative to the stand.

15. The display device of claim 14, wherein the support comprises a first supporting portion and a second supporting portion, the first supporting portion comprises a pivot pole, the second supporting portion defines a pivot hole, the second pole defines a through hole, and the pivot pole is engaged in the through hole and the pivot hole.

16. The display device of claim 15, wherein an anti-slip ring surrounds on the first supporting portion, and another anti-slip ring surrounds on the second supporting portion.

17. The display device of claim 10, wherein the monitor defines a through opening, a mounting member comprises two mounting pieces secured to an inner surface of the monitor and a rotating piece rotatably secured between the two mounting pieces, the rotating piece is located outside of the monitor through the through opening, and the first pole is secured to the rotating piece.

18. The display device of claim 17, wherein a concave portion is defined in the monitor on outer surface, the first pole is located in the concave portion, and the through opening is defined in the concave portion.

19. The display device of claim 8, wherein the second pole is connected to the first pole.

* * * * *